(12) United States Patent
Fink et al.

(10) Patent No.: US 6,743,133 B2
(45) Date of Patent: Jun. 1, 2004

(54) CHAIN DRIVE, ESPECIALLY A CAMSHAFT/CAMSHAFT DRIVE FOR A MOTOR VEHICLE

(75) Inventors: Thomas Fink, Dachau (DE); Peter Schulze, Eching (DE)

(73) Assignee: Joh. Winkelhofer & Sohne GmbH und Co. KG, Munich (DE)

( * ) Notice: Subject to any disclaimer, the term of this patent is extended or adjusted under 35 U.S.C. 154(b) by 0 days.

(21) Appl. No.: 10/009,370

(22) PCT Filed: Feb. 1, 2001

(86) PCT No.: PCT/EP01/01050
§ 371 (c)(1),
(2), (4) Date: Apr. 25, 2002

(87) PCT Pub. No.: WO01/81790
PCT Pub. Date: Nov. 1, 2001

(65) Prior Publication Data
US 2002/0137583 A1 Sep. 26, 2002

(30) Foreign Application Priority Data
Apr. 19, 2000 (DE) ........................................ 100 19 458

(51) Int. Cl.⁷ ................................................ F16H 7/18
(52) U.S. Cl. .......................................... 474/140; 474/87
(58) Field of Search ................................ 474/152, 156, 474/148, 144, 140, 87, 84; 123/90.31, 90.17

(56) References Cited
U.S. PATENT DOCUMENTS

| | | | | |
|---|---|---|---|---|
| 4,117,813 A | * | 10/1978 | Yamashita et al. | 123/334 |
| 4,553,509 A | * | 11/1985 | Mezger et al. | 123/90.27 |
| 4,951,616 A | * | 8/1990 | Aruga et al. | 123/195 A |
| 4,971,000 A | * | 11/1990 | Shimura et al. | 123/90.31 |
| 5,000,142 A | * | 3/1991 | Aruga et al. | 123/195 C |
| 5,216,984 A | * | 6/1993 | Shimano et al. | 123/41.44 |
| 5,471,895 A | | 12/1995 | Ohmon et al. | 74/567 |

FOREIGN PATENT DOCUMENTS

| | | | |
|---|---|---|---|
| DE | 3347638 | 7/1985 | |
| DE | 3516097 A1 | * 11/1986 | B65G/13/07 |
| DE | 4118862 | 12/1992 | |
| DE | 142041 A1 | 7/2001 | |
| EP | 0575044 | 12/1993 | |
| JP | 57210109 | 12/1982 | |
| JP | 06248968 A | * 9/1994 | F02B/67/06 |
| JP | 10121914 A | * 5/1998 | F01L/1/04 |
| WO | WO 8302307 A1 | 7/1983 | |

* cited by examiner

*Primary Examiner*—David A. Bucci
*Assistant Examiner*—Vicky A. Johnson
(74) *Attorney, Agent, or Firm*—Marshall, Gerstein & Borun LLP

(57) ABSTRACT

The present invention relates to a chain drive, in particular camshaft/camshaft drive for an automotive engine, the chain drive comprising at least two chain gears and a drive chain. Such a chain drive shall be made more compact without excessively great losses in its low-noise characteristics. To this end at least two chain gears are arranged in laterally offset relationship with one another in axial direction. The drive chain is a multiple-track chain. Each of the offset chain gears has assigned thereto a separate track of the multiple-track chain due to the lateral offset. The tip diameters of the offset chain gears are overlapping.

10 Claims, 2 Drawing Sheets

CHAIN DRIVE, ESPECIALLY A CAMSHAFT/CAMSHAFT DRIVE FOR A MOTOR VEHICLE

FIELD OF THE INVENTION

Figure 1:
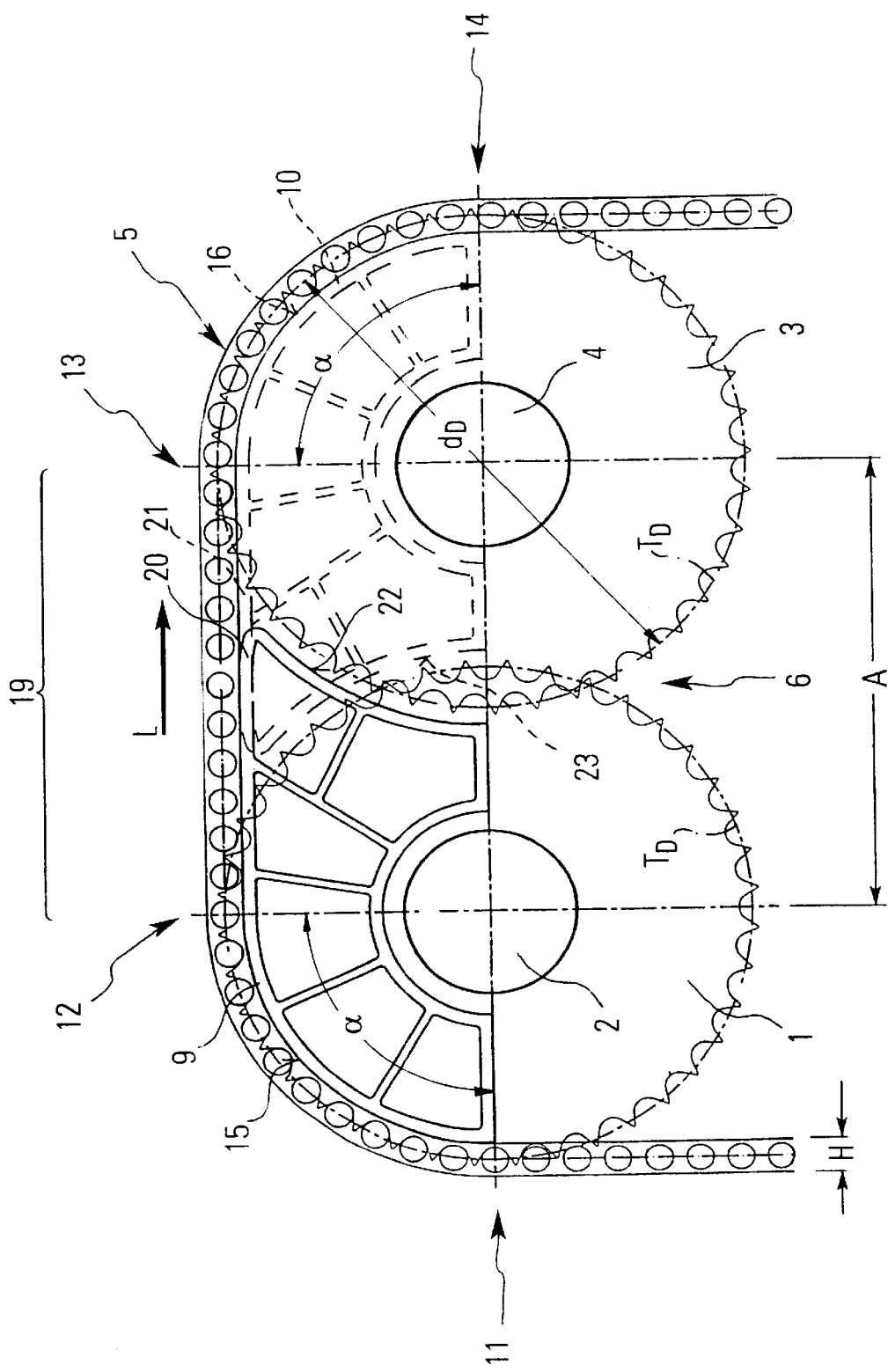

The present invention relates to a chain drive, in particular camshaft/camshaft drive for an automotive engine, the chain drive comprising at least two chain gears and a drive chain.

BACKGROUND OF THE INVENTION

In particular in the field of internal combustion engines, there is a need for reliably functioning control chain drives. In this respect high demands are made on the low-noise characteristics of such chain drives, so that numerous measures are taken for preventing unnecessary vibrations as well as running noise caused thereby. It is generally known that a quiet run can be expected when the number of teeth of the chain gears is great; that is why small chain gear sizes are not willingly accepted. On the other hand, more and more efforts are made to provide compact internal combustion engines as well as chain drives needed therefor. In a camshaft/camshaft drive for an automotive engine, limits are already set by the axial distance between the two camshafts, which must be kept in mind.

SUMMARY OF THE INVENTION

It is therefore the object of the present invention to improve a chain drive of the above-mentioned type with respect to its compactness, with noise or wear aspects being paid attention to.

According to the invention this object is achieved in that at least two chain gears are arranged in laterally offset relationship with one another in axial direction, the drive chain is a multiple-track chain, each of the offset chain gears has assigned thereto a separate track of the multiple-track chain due to the lateral offset, and the tip diameters of the offset toothed wheels are overlapping. Normally, multiple-track chains are only used in fields where they are in engagement with a multiple-track chain gear to be able to transmit large forces. In this case, however, a multiple-track chain is used for simultaneously driving chain gears that are laterally offset to one another, namely in the form that the chain gears are even overlapping. With a standard arrangement without a lateral offset, such an overlap would of course not be possible. At the same time, however, the number of teeth of the chain gears can be kept large despite the axial distance which is per se too small so as to achieve a run of the multiple-track chain that is as quiet as possible. Theoretically, it would be possible with such an arrangement to make the chain gears overlapping to such an extent that the gearing of the one chain gear almost contacts the axis of the other chain gear. When a projection of the axes is avoided, an even greater overlap would be possible. However, the two chain gears should not be seated on a joint axle or shaft, but should drive different elements (e.g. camshafts). The number of the offset chain gears can be chosen in dependence upon the number of the tracks of the multiple-track chain. The chain gears can have different tooth numbers.

In dependence upon the speeds to be used and the forces to be transmitted, it may further be necessary for the prevention of tilting moments that at the side next to the gearings of the overlapping chain gears a respective support means is provided for the track of the multiple-track chain that is not in engagement with the associated chain gear. The force of the chain gear acting on the multiple-track chain is asymmetrical relative to the longitudinal center line of the multiple-track chain, so that corresponding asymmetrical forces are acting thereon. Support means help to prevent a lateral tilting of the multiple-track chain, whereby noise can once again be minimized because corresponding vibrations are suppressed.

Track means each time that part of the multiple-track chain that is laterally provided next to a chain gear but not in engagement therewith. Said track is of course in engagement with the respectively other chain gear.

In case the track is to be supported by the chain gears themselves, such a configuration has its limits. It is therefore preferred in one embodiment that an overlap of the chain gears is greater than the sum of the height of the plates of the multiple-track chain and of the difference of tip circle radius less pitch circle radius. A support means integrated on the chain gear would come into contact with the gearing of the respectively other chain gear in the case of such a dimensioning rule.

According to a further embodiment it is therefore intended to provide slide rails as support means. As a rule, these are at a standstill relative to the chain gears, and the track is sliding therealong. Slide rails have already been used in chain drives for very different purposes for a long time so that the problems associated therewith have already been solved in the prior art in many ways. Materials and, if necessary, also lubricant supply can readily be used for the slide rails. It is also possible to choose a multipart construction of the slide rails. Known is e.g. the use of a relatively stable basic body and a slide lining which is arranged thereon and can be removed and exchanged in part.

Preferably, a distance of the slide surface of the slide rail may substantially be equal to half the plate height or half a roller height at least in the area of the wrap angle of the multiple chain on the associated chain gear to the pitch circle of the chain gear. It is here of importance whether the plates are to be supported by the support means or whether the rollers of a multiple-track chain are to be used for the support. The dimensioning rule ensures that the hinge axes of the multiple-track chains are oriented as parallel as possible relative to the axes of the chain gears.

According to a further variant a great advantage is that the slide rail comprises a transfer extension which supports the track of the multiple-track chain in the section between the overlapping chain gears. Despite the overlapping chain gears a section remains in most cases between the two wheels where the multiple-track chain is neither in engagement with the one nor the other chain gear. To avoid excessive vibrations and associated noise upon exit from the one chain gear and/or entry on the other chain gear, a support is also provided for this area.

Advantageously, the transfer extensions of the slide rails assigned to the overlapping chain gears can overlap and jointly support the multiple-track chain in the section between the overlapping chain gears. When both slide rails are equipped with such transfer extensions, a tilting movement of the multiple-track chain is also avoided in the intermediate part between the chain gears because the multiple-track chain is supported over its whole width.

A smooth entry or exit of the multiple-track chain is ensured when according to one embodiment a slide surface of the transfer extension passes tangentially into the adjoining remaining slide surface of the slide rail.

To give the slide rail a sufficiently stable configuration and to make the transfer extension as rigid as possible, a bottom side of the slide rail which defines at least the transfer extension is arcuately adapted to the outer contour of the other chain gear. In a particular embodiment this has even the effect that the multiple-track chain is completely supported between the exit point on the first chain gear and the exit point from the second one of the overlapping chain gears. The transfer extensions are guided relatively close to the other chain gear, resulting each time in only small portions on which the track is not supported. However, the multiple-track chain is respectively supported in said portions by the transfer extensions arranged in offset configuration relative thereto. The bottom side of the transfer extension is each time adapted relatively close to the outer contour of the adjoining chain gear, so that a stable support of the slide surface can be realized without a design that is too filigree.

Furthermore, it is of advantage when the chain gears have the same size and tooth number. It is here in particular possible to give also the slide rails an identical design and to arrange each in offset relationship with respect to one another.

Figure 2:
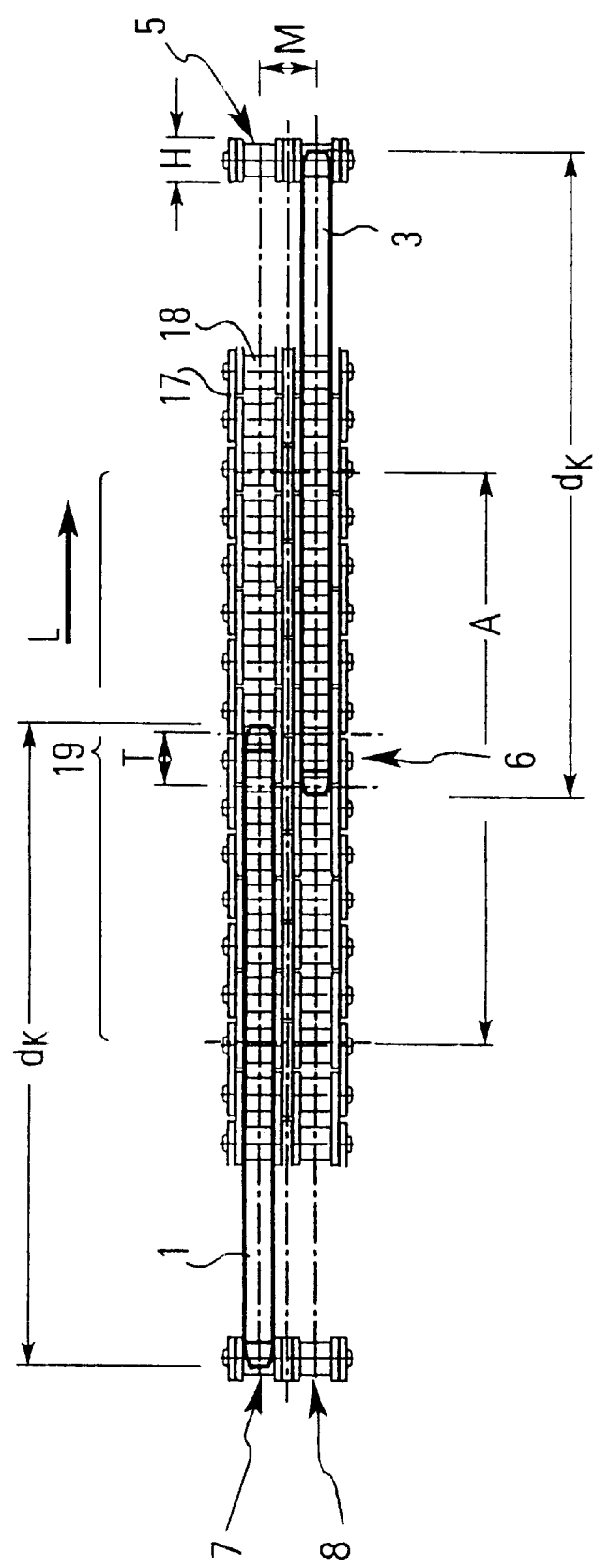

An embodiment of the present invention shall now be explained in more detail with reference to a drawing, in which:

FIG. 1 is a schematic front view on the upper part of a camshaft/camshaft chain drive; and FIG. 2 is a schematic top view on the chain drive of FIG. 1, wherein the slide chains have been omitted for the sake of clarity.

DETAILED DESCRIPTION OF THE INVENTION

FIG. 1 shows the upper part of a camshaft/camshaft drive. The first chain gear 1 is seated on a first camshaft 2, and the second chain gear 3 is seated on a second camshaft 4. Chain gears 1, 3 are connected to camshafts 2, 4 by means of standard connection methods. The arrangement of the chain drive in a chain case or a closed engine channel shall not be discussed in more detail in the following.

In the present embodiment, each of chain gears 1, 3 has 40 teeth. The pitch is 9.525 mm.

The two chain gears 1, 3 have guided therearound a duplex chain 5 which is also in engagement with a gear (not shown) of the crankshaft. The duplex chain is constituted by two plate type roller chains of a standard construction which are arranged in parallel with one another and interconnected by means of an intermediate pin plate. Such duplex chains 5 are also called double roller chains.

The axial distance A of the two chain gear axes has been chosen such that the two chain gears 1, 3 are overlapping. However, as can be seen in FIG. 2, these are arranged to be laterally offset relative to one another when viewed in axial direction, so that they are arranged side by side in their overlap area 6. In the present embodiment, the chain gear 1 is positioned behind the chain gear 3 (starting from FIG. 1). The center distance M of the two chain gears 1 and 3 relative to one another also corresponds to the associated center distance M of the duplex chain 5 and is 10.34 mm in the present embodiment. This center distance M could also be referred to as the offset of the two chain gears 1, 3. Thus the chain gear 1 is in engagement with a first track 7 and the chain gear 3 with a second track 8 of the duplex chain 5. Since each of said chain gears 1, 3 has assigned thereto a track 7, 8 of its own, it is possible to provide an overlap area 6. FIG. 2 shows the overlap T of the pitch circles $T_D$ of the two chain gears 1, 3. In this embodiment T is equal to 10 mm. However, the tip diameters $d_K$ of the two chain gears 1, 3 must also be taken into account for a support, which will still have to be described in more detail in the following.

A slide rail 9 and 10, respectively, is positioned laterally next to a chain gear 1 or 3.

If it is assumed in the present example that the running direction of chain L is clockwise, the wrap angle α of the duplex chain is 90° in the first chain gear 1 between entry point 11 and exit point 12. This is also true for the second chain gear 3 in the case of which a wrap angle α of 90° is formed between entry point 13 and exit point 14. In this area, the slide rails 9, 10 have an arcuate slide surface 15 and 16, respectively. The distance of the slide surfaces 15, 16 relative to the associated pitch circle $T_D$ of the chain gears 1 or 3 is here equal to half the height H of a plate 17 of the duplex chain 5. However, it is also possible to adapt the slide rails 9, 10 with their slide surface 15 and 16, respectively, to the rollers 18 of the duplex chain 5, so that these roll on the slide surface 15 or 16. The pitch circle $T_D$ is drawn in FIG. 1 in each chain gear 1 and 3.

The slide rails 9, 10 are secured to a stationary part, e.g. the engine casing, or are mounted on a bearing seat section and are at a standstill relative to the chain gears 1, 3. In the intermediate part 19, which is essentially of length A, the duplex chain 5 is no longer supported by the chain gear 1 or 3. To avoid unnecessary vibrations in this area 19, each of the slide rails 9, 10 has a transfer extension 20 and 21, respectively. The transfer extension 20, 21 has the shape of a nose or a triangle, the slide surface of the transfer extension 20, 21 passing tangentially into the remaining slide surface 15 and 16, respectively, of the slide rails 9, 10. The slide surface of the transfer extension 20, 21 extends substantially along a straight line. As can be seen in FIG. 1, the two transfer extensions 20, 21 are overlapping, so that both tracks 7, 8 of the duplex chain 5 are supported in the area of the intermediate part 19.

Each of the two slide rails 8, 10 ensures that no tilting moments are acting on the duplex chain 5 and that, as a consequence, excessive vibrations will not arise, in particular, upon entry on a chain gear or exit from a chain gear. The slide rails 9, 10 may e.g. consist of a wear-resistant plastic material. However, it is also possible to produce the rails from a basic body of e.g. aluminum and to provide them with a slide lining which is possibly removable. The bottom side 22, 23 of the slide rails 9, 10 which defines the transfer extension 20, 21 is adapted to the outer contour of the adjoining chain gear 1 or 3 and arranged at a small distance from said wheel. It is thereby also possible to give the transfer extension 20, 21 a very stable design. Each of the slide rails 9, 10 is drawn down to the level of the entry point 11 and exit point 14, respectively, and has a substantially arcuate form with the transfer extension 20, 21 arranged at one side. A truss structure increases the stability at a low weight.

Thanks to the use of the slide rails 9, 10, it is possible to produce relatively large overlap areas 6 because the boundary of the overlaps just depends on the size of the camshafts 2, 4.

Except for the specifically molded-on slide rails 9 and 10, only standard machine elements are used in the present construction so that it is possible to create the arrangement according to the invention by making a few modifications.

We claim:

1. A chain drive for an automotive engine, comprising in combination at least two chain gears (1, 3), a drive chain (5), said at least two chain gears (1, 3) being arranged in laterally offset relationship with one another in an axial direction, wherein said offset chain gears (1, 3) have tip diameters ($d_k$) being in engagement with a separate track of said multiple-track chain (5) and have assigned thereto a fixed support rail (9, 10) being in line with the associated chain gear (1, 3) for supporting and being in slide contact with the respective separate track of said associated chain gear (1, 3) at a side next to the chain gear (1, 3) which is offset from and not in engagement with the respective track.

2. The chain drive according to claim 1, wherein said chain gears (1, 3) are overlapping by an overlap ($d_k$–A) that is greater than the sum of a plate height (H) of plates (17) of said multiple track chain (5) and of a difference of tip circle radius ($d_k/2$) less pitch circle radius ($d_D/2$).

3. The chain drive according to claim 1, wherein a distance of a slide surface (15, 16) of said slide rail (9, 10) from a pitch circle ($T_D$) of the associated chain gear (1, 3) substantially corresponds to one of half the plate height (H/2) at least in an area of a wrap angle (α) of said multiple-track chain (5).

4. The chain drive according to claim 1, wherein said slide rails (9, 10) have a transfer extension (20, 21) which supports said track (7, 8) of said multiple-track chain (5) in a section (19) between said chain gears (1, 3).

5. The chain drive according to claim 4, wherein said transfer extension (20, 21) of said slide rails (9, 10) assigned to said chain gears (1, 3) are overlapping and jointly support said multiple-track chain (5) in said section (19) between said chain gears (1, 3).

6. The chain drive according to claim 4, wherein a slide surface of said transfer extensions (20, 21) passes tangentially into the adjoining remaining said slide surface (15, 16) of said slide rail (8, 9).

7. The chain drive according to claim 4, wherein a bottom side (22, 23) of each of said slide rails (9, 10) which defines at least said transfer extensions (20, 21) is arcuately adapted to an outer contour of a non-axially adjacent one of said chain gears (1, 3).

8. The chain drive according to claim 7, wherein said multiple-track chain (5) is completely supported between an entry point (11) on said first chain gear (1) and an exit point (14) from said second chain gear (3).

9. The chain drive according to claim 1, wherein said chain gears (1, 3) have the same size and tooth number.

10. The chain drive according to claim 1, wherein a distance of the slide surface (15, 16) of said slide rail (9, 10) from the pitch circle ($T_D$) of the associated chain gear (1, 3) substantially corresponds to half the roller height at least in the area of the wrap angle (α) of said multiple-track chain (5).

* * * * *

UNITED STATES PATENT AND TRADEMARK OFFICE
CERTIFICATE OF CORRECTION

PATENT NO. : 6,743,133 B2
DATED : June 1, 2004
INVENTOR(S) : Thomas Fink et al.

It is certified that error appears in the above-identified patent and that said Letters Patent is hereby corrected as shown below:

<u>Title page,</u>
Item [73], Assignee, replace "Sohne" with "Söhne"; and
Item [57], ABSTRACT,
    Replace "The present invention relates to a chain drive, in particular camshaft/ camshaft drive for an automotive engine, the chain drive comprising at least two chain gears and a drive chain. Such a chain drive shall be made more compact without excessively great losses in its low-noise characteristics. To this end at least two chain gears are arranged in laterally offset relationship with one another in axial direction. The drive chain is a multiple-track chain. Each of the offset chain gears has assigned thereto a separate track of the mutiple-track chain due to the lateral offset. The tip diameters of the offset chain gears are overlapping." with -- A chain drive, in particular camshaft/camshaft drive for an automotive engine, comprising at least two chain gears and a drive chain, is made compact without excessively great losses in its low-noise characteristics. At least two chain gears are arranged in laterally offset relationship with one another in axial direction. The drive chain is a multiple-track chain. Each of the offset chain gears has assigned thereto a separate track of the multiple-track chain due to the lateral offset. The tip diameters of the offset chain gears are overlapping. --

Signed and Sealed this

Twenty-first Day of September, 2004

JON W. DUDAS
*Director of the United States Patent and Trademark Office*